Nov. 26, 1968    J. R. HALL    3,412,825
SILENCER OR MUFFLER AND METHOD OF PRODUCING SAME
Filed Aug. 11, 1967    3 Sheets-Sheet 1

INVENTOR.
JAMES R. HALL
BY
Harry O. Ernsberger
ATTORNEY

INVENTOR.
JAMES R. HALL
BY
Harry O. Ernsberger
ATTORNEY

Nov. 26, 1968 J. R. HALL 3,412,825
SILENCER OR MUFFLER AND METHOD OF PRODUCING SAME
Filed Aug. 11, 1967 3 Sheets-Sheet 3

INVENTOR.
JAMES R. HALL
BY
Harry O. Ernsberger
ATTORNEY

United States Patent Office
3,412,825
Patented Nov. 26, 1968

1

3,412,825
SILENCER OR MUFFLER AND METHOD OF
PRODUCING SAME
James R. Hall, Toledo, Ohio, assignor to Oldberg
Manufacturing Company, Grand Haven, Mich., a
corporation of Michigan
Filed Aug. 11, 1967, Ser. No. 660,049
7 Claims. (Cl. 181—61)

ABSTRACT OF THE DISCLOSURE

This invention relates to sound attenuation apparatus and more especially to a silencer or muffler and method of producing same for attenuating sound waves of an exhaust gas stream of an internal combustion engine of an automotive vehicle and embraces a one-piece tubular muffler shell with dome-shaped smoothly-curved end regions in combination with tubular bushings or nipples fitted into openings at the ends of the muffler shell in a manner whereby the bushings or nipples are adjustable to various angularities and the bushings or nipples in adjusted position welded to the ends of the muffler shell.

---

The present invention relates to silencers or mufflers and method of producing same, the silencers or mufflers being particularly adapted for attenuating sound waves of exhaust gas streams from internal combustion engines of automotive vehicles. Sound attenuating muffler constructions have been fashioned with cylindrical shells having end headers or end secured to the shell by crimping or welding with connecting bushings, nipples or tubular coupling members secured by welding to the end headers.

In such constructions, the bushings were necessarily disposed on an axis coincident or parallel with the longitudinal axis of the shell. The chassis frame of the present design of an automotive vehicle embodies several reinforcement or structural members rendering it necessary to fashion the muffler and the nipples or bushings so that the latter coincide with the exhaust conveying piping and the muffler positioned so as not to interfere with components of the chassis construction. In prior installations requiring special angularly-arranged bushings or nipples, the bushings or nipples were integrally formed with the end heads with the bushings or nipples fashioned to the desired angularity. A muffler construction of this character is disclosed in the U.S. patent to Sparrow 2,690,812. With such construction, end heads having integral nipples of various angularities were required in order to adapt the muffler construction to various types of chassis installations.

Another method of providing a muffler shell with a bushing which may be adjusted relative to the shell is disclosed in the U.S. patent to Andrews 3,274,678. In this construction the nipple has an enlarged flared portion curved to fit the exterior of the dome-shaped end region of a muffler and a curved terminal region of the flared portion welded to the curved surface region of the shell. In such constructions the plane of the weld is not normal to the muffler axis where the nipple or bushing is disposed at an angle with respect to the muffler axis, a condition which renders fabrication difficult and costly.

The present invention embraces the provision of a silencer or muffler construction embodying a one-piece tubular shell fashioned with smoothly-curved dome-shaped end regions defining an opening of a size and shape to receive and accommodate a thin-walled metal coupling member, nipple or bushing which is angularly adjustable and the coupling members, nipples or bushings welded to the end region of the muffler shell defining the opening therein.

2

The invention embraces a method of fabricating a muffler involving fashioning the end region of a tubular muffler shell to a dome-shaped configuration terminating in an opening of a shape or contour to receive a generally cylindrically-shaped or oval-shaped portion of a tubular bushing or nipple, adjusting the angular position of the bushing or nipple relative to the axis of the shell and welding the bushing or nipple to the end region of the shell.

Another object of the invention resides in a muffler construction including a tubular muffler shell having an opening in an end thereof accommodating an end region of a tubular nipple or bushing and wherein the nipple or bushing is adjusted to an angular position relative to the longitudinal axis of the muffler shell whereby the exterior wall of the nipple or bushing is in contact with the edge region of the metal of the muffler shell defining the opening and the nipple or bushing welded to the end of the muffler shell at the zone of contact throughout the periphery of the nipple or bushing.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which.

Figure 1:
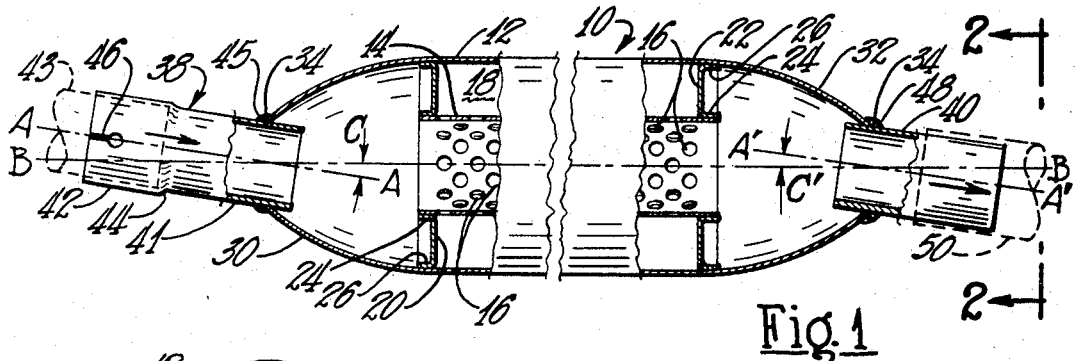
FIGURE 1 is a plan view partly in section of a form of muffler construction illustrating tubular nipples or bushings in angularly-arranged positions with respect to the longitudinal axis of the muffler shell.
Figure 2:
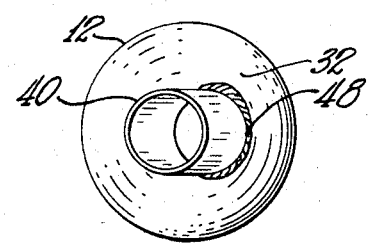
FIGURE 2 is an end view of the construction shown in FIGURE 1, the view being taken on the line 2—2 of FIGURE 1.

Referring to the drawings in detail and initially to FIGURES 1 and 2, the sound attenuating means or muffler construction 10 is inclusive of a shell 12 of one piece of sheet metal fashioned of generally cylindrical tubular shape in which is disposed a gas passage means in the form of a generally cylindrical gas passage tube 14 of sheet metal, the tube being of lesser diameter than that of the shell 12 and having a comparatively large number of small openings or open areas 16 which form acoustic couplings with the elongated annular sound attenuating chamber 18 between the gas passage tube 14 and the shell 12.

In the form shown in FIGURES 1 and 2, spaced partitions or baffles 20 and 22 fashioned of sheet metal and of annular shape are disposed in lengthwise spaced relation within the shell 12 and form end walls of the annular sound attenuating chamber 18. Each of the partitions or baffles is fashioned with an inner circular flange 24 defining an opening in which is snugly fitted the gas passage tube 14 which may, if desired, be welded to one or both of the flanges. Each partition is fashioned with a peripheral flange 26 which is snugly fitted into the interior of the shell 12.

As shown in FIGURE 1, the end regions of the muffler shell are of dome-shaped configuration, and in the method of fabrication, the assembly of gas passage tube 14 and partitions 20 and 22 are disposed within the cylindrical tubular shell 12 before the second end region of the shell is reduced in dimension to form the dome-shaped configuration. The shell 12 of sheet metal may be of the seamless tube type or may be fashioned of the tube of the seam welded type. As shown in FIGURE 1, the dome-shaped end sections or regions 30 and 32 are configurated with a generally inward taper but each end region is smoothly curved and of gradually decreasing diameter from the central cylindrical portion of the shell to an end or terminus 34 to form a dome shape.

The curved end sections or regions 30 and 32 of the shell may be fashioned by swaging the metal tube by means of swaging dies, or the metal of the tube may be spun inwardly to the dome-shaped configuration illustrated in the drawings.

In the form shown in FIGURE 1, the terminus of each end section is a circular edge 34 defining a circular opening, the circular terminal edge 34 lying in a plane normal to the longitudinal axis of the tubular shell 12. By reason of the swaging or spinning operations in progressively reducing the metal at the end regions to a dome shape, the metal constituting the dome shape may be progressively slightly increased in thickness.

The invention embraces an arrangement providing a nipple, bushing or coupling member for each end of the muffler shell 12 extending into the openings in the ends of the muffler shell and joined to the circular metal edge defining the openings in the shell, the nipples, bushings or couplings being adaptable for positioning angularly with respect to the longitudinal axis of the shell. As shown in FIGURE 1, the construction includes an inlet nipple, bushing or coupling member 38 and an outlet nipple, bushing or coupling member 40. The portion 41 of the inlet nipple 38 is of cylindrical configuration and is of a diameter to be loosely slidably received in the opening 34 in the inlet end of the muffler 10.

The inlet nipple may be fashioned with a slightly enlarged cylindrical portion 42 to accommodate an exhaust pipe 43, shown in broken lines, which conveys exhaust gases from an internal combustion engine into the muffler. The juncture 44 of the enlargement 42 with the portion 41 provides an abutment for defining the extent of telescoping relation of portion 42 with the exhaust pipe 43. In this form of construction the axis A—A of the inlet nipple 38 may be disposed in angular relation with respect to the longitudinal axis B—B of the muffler.

It is found that by fashioning the diameter of portion 41 so that it is loosely slidably received in the opening defined by the terminus 34 of the muffler shell, that the nipple 38 may be positioned at an angle of a few degrees as indicated at angle C without unduly distorting the edge defining the opening 34 or the cylindrical portion 41 of the inlet nipple. With normal sliding clearance between the nipple portion 41 and the opening in the muffler shell, it is found that the nipple may be angularly disposed up to about eight degrees as indicated at angle C with respect to the muffler axis B—B without appreciably distorting the edge 34 defining the circular opening or the cylindrical portion 41 of the nipple 38.

It is to be understood that if a greater angularity is desired for the nipple 38, i.e., for angle C, the portion 41 of the nipple 38 may be reduced in diameter or the opening defined by the edge 34 in the muffler shell may be increased in diameter. In assembly, the peripheral surface region of the nipple 41 is welded as at 45 to the end of the muffler shell at the zone of the edge 34. The welding serves to form a gas tight seal or joint between the muffler and the inlet nipple and to maintain the nipple in a fixed angular relation with respect to the axis of the muffler shell.

The enlarged portion 42 is provided with diametrically-opposed open-ended slots 46 and a clamp (not shown) of conventional construction placed around the portion 42 to clamp the same into engagement with an exhaust pipe 43 in a well known manner.

The exterior surface of the outlet nipple 40 is of circular cylindrical cross section and is received in the opening at the outlet end of the muffler in the same manner as the inlet nipple. The outlet nipple may be angularly arranged in the same manner as the inlet nipple on an axis A'—A' whereby the axis of the inlet nipple is arranged at an angle C' relative to the axis B—B of the muffler shell.

It is to be understood that the angles C and C' for the axes of the nipples may be varied by increasing or reducing the clearance spaces between the peripheries of the nipples and the circular edges 34 defining the openings in the ends of the shell 12. The outlet nipple 40, adjusted to an angular position, is welded as at 48 at the circular edge 34 to provide a gas tight seal between the muffler shell and the nipple and maintain the nipple 40 in the desired angular position. A tailpipe or exhaust gas conveying pipe 50, shown in broken lines, may be telescoped over the outlet pipe 40 and a clamp (not shown) of conventional construction placed around the tailpipe to clamp the latter to the nipple 40.

In assembling the inlet and outlet bushings in the openings in the muffler shell the adjustment of the nipples or bushings in their angular positions causes the peripheries of the bushings to snugly engage the terminal edges 34 and may slightly distort the circular configuration of the nipples at the region of engagement thereof with the terminal edges defining the openings in the shell so as to substantially eliminate any clearance spaces before the nipples are joined to the shell by welding as at 45 and 48.

In the event that the nipples are adjusted to a lesser angular position, the metal providing the welds 45 and 48 will fill any slight clearance to provide gas tight seals.

Figure 3:
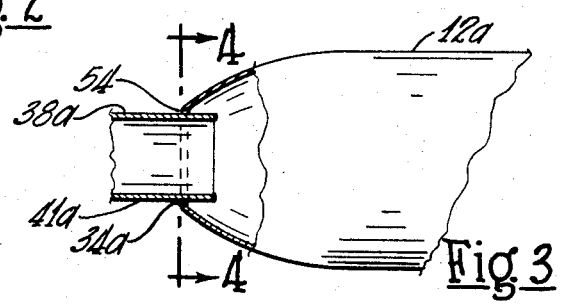
FIGURE 3 is a fragmentary view of a muffler shell and tubular bushing or nipple illustrating a step in the method of assembly wherein the tubular bushing or nipple is received in an opening in the end of the muffler shell of larger diameter than the exterior diameter of the bushing or nipple.
Figure 4:
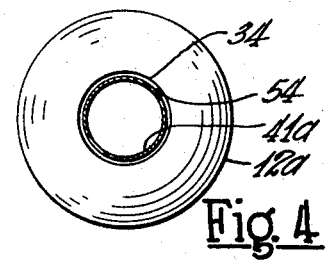
FIGURE 4 is a sectional view taken substantially on the line 4—4 of FIGURE 3.
Figure 5:
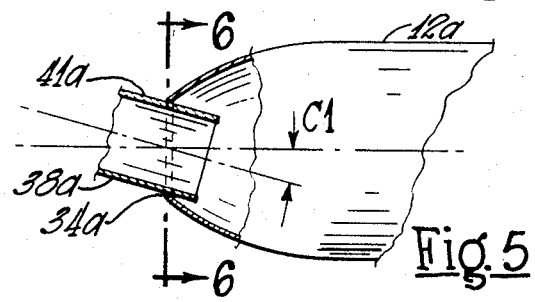
FIGURE 5 illustrates the construction of FIGURE 3 with the tubular bushing or nipple angularly disposed in a position to effect engagement of the bushing or nipple throughout substantially its periphery with the end region of the muffler shell defining the opening.
Figure 6:
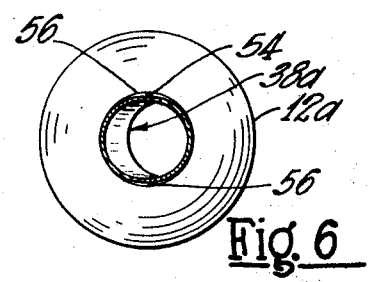
FIGURE 6 is a sectional view taken substantially on the line 6—6 of FIGURE 5.

FIGURES 3 and 4 illustrate a muffler shell 12a and a portion of an inlet nipple 38a wherein the circular edge 34a is larger than the diameter of the cylindrical portion 41a of the inlet nipple providing an appreciable annular clearance opening 54. FIGURES 5 and 6 illustrate the nipple or bushing 38a in an adjusted angular position in the opening defined by the terminal edge 34a of the muffler shell. By reason of the annular clearance space 54, the angle C1 for the nipple 38a may be substantially greater than the angle C or C' shown in FIGURE 1 where a greater angularity is desired for the nipple or bushing than in the arrangement shown in FIGURES 1 and 2.

In the angular position of the nipple, as shown in FIGURE 6, the annular space 54 is partially closed as shown in FIGURE 6 in which position the nipple or bushing 38a may be welded to the circular edge 34a of the opening in the end of the muffler shell 12a, the welding metal filling the open regions 56 which are not closed by the peripheral cylindrical surface of the nipple or bushing 38A. If desired, the bushing 38a may be adjusted to a greater angle than C1 shown in FIGURE 5 which adjustment to an increased angular position distorts the circular cross section of the nipple 38a to a slightly oval shape thereby effecting a closure of the open spaces 56.

It will be apparent that by controlling or modifying the size of the annular space 54 between the edge 34a of an end opening in the muffler shell and the exterior surface of portion 41a of the nipple 38a, various degrees of angularity for the angle C1 may be had to enable proper connection with an exhaust pipe with respect to the muffler shell 12a. An outlet nipple for the muffler shell 12a may be secured in the outlet end of the muffler shell in the same manner as the inlet nipple 38a.

With the construction of the nipple shown in FIGURES 1 through 6, the inlet nipple may be fashioned from a length of tubing enlarged, if desired, as at 42 in FIGURE 1 to accommodate an exhaust pipe, and the outlet nipple may be a section of cylindrical tube cut to the proper length. This method of forming the nipples is inexpensive and provides nipples of a character which may be adjusted to various angular positions simply by modifying the size of the annular space 54 between the peripheral surface of a nipple and the circular edge defining an opening in the end of a muffler shell receiving the nipple.

As a nipple may be distorted to a limited extent as described in connection with FIGURES 5 and 6, some degree of latitude is thus provided for adjusting the angularities of a nipple with respect to the muffler shell simply by stressing the angular position of the nipple to slightly distort the cross sectional configuration of the nipple at the region of its engagement with the circular edge defining an opening in the muffler shell.

Figure 7:
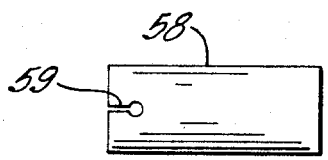
FIGURE 7 is an elevational view of a cylindrically-shaped tubular bushing.
Figure 8:
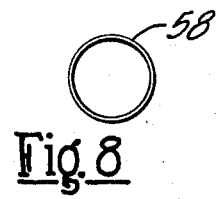
FIGURE 8 is an end view of the bushing shown in FIGURE 7.

FIGURES 7 and 8 illustrate an inlet bushing, nipple or coupling member 58 of annular cross section of cylindrical shape throughout its entire length. With an inlet nipple of the character shown in FIGURES 7 and 8, one end may be provided with diametrically opposed slots 59 so that this region of the nipple may be engaged by a clamp (not shown) of conventional construction surrounding the slotted region to clamp the nipple into snug engagement with an exhaust pipe telescoped into the slotted end of the nipple 58.

Figure 9:
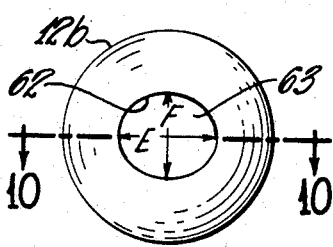
FIGURE 9 is an end view of a one-piece muffler shell with an end opening slightly oval or elliptical in shape.
Figure 10:
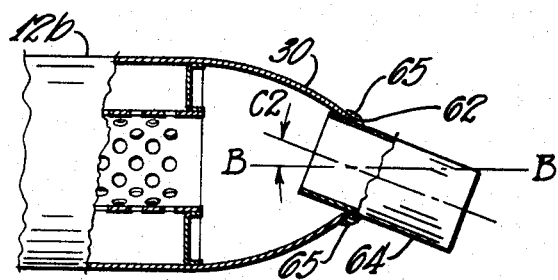
FIGURE 10 is a fragmentary sectional view taken substantially on the line 10—10 of FIGURE 9 and illustrating an angular position of the bushing or nipple with respect to the muffler shell.

FIGURES 9 and 10 illustrate a modified arrangement of bushing and muffler shell construction. In this form the muffler shell 12b has a dome-shaped end region 30 terminating in an edge 62 of slightly oval configuration defining an oval-shaped opening 63, as shown in FIGURE 9. The oval opening 63 may be in the form of an ellipse. As shown in FIGURE 9, the horizontal dimension E of the oval configuration is greater than the vertical dimension F.

A nipple or bushing 64, which is preferably of tubular configuration of circular cross section, is of an exterior diameter slightly less than the vertical distance F of the opening 62 so that the nipple may be received in the opening without distortion. During assembly, the nipple 64 is moved or adjusted to an angular position indicated by angle C2 with respect to the axis B—B of the muffler shell in a horizontal direction whereby the exterior surface of the nipple 64 is engaged with the edge 62 throughout the periphery of the nipple.

In assembly, the nipple 64 is welded as at 65 throughout its periphery to the edge 62 of the opening 63 to permanently retain the nipple in its angular position and effect a seal between the nipple and the muffler shell 12b. In this form of construction, a nipple may be disposed in angular position without distorting the circular cylindrical shape of the nipple.

Figure 11:
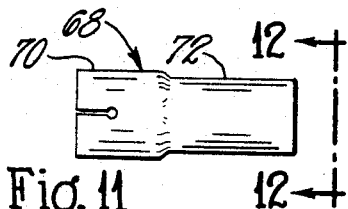
FIGURE 11 is an elevational view of a nipple or coupling member having a portion of slightly oval shape in cross sectional configuration.
Figure 12:
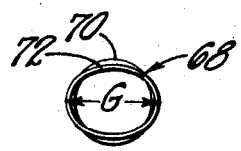
FIGURE 12 is an end view on the line 12—12 illustrating the slightly oval-shaped configuration.

FIGURES 11 and 12 illustrate a modified form of nipple or bushing for the inlet end of a muffler construction. In this form the tubular inlet nipple or bushing 68 has a portion 70 of circular cross section and a portion 72 of slightly oval or elliptical shape. The elliptically shaped or oval portion 72 may be fitted into a circular opening in the end of a muffler shell, such opening being of a diameter sufficient to snugly receive the longer dimension G of the oval configuration.

The nipple is then moved to an angular position to an extent wherein the exterior surface of the oval shaped portion 72 contacts the edge defining a circular opening in the end of a muffler shell throughout the periphery of the oval configuration without distorting the oval configuration of the portion 72 and provide a desired angular relation for the nipple with respect to the axis of a muffler shell. The annular cylindrically-shaped portion 70 is adapted to receive an exhaust pipe in the conventional manner telescoped into the portion 70. It is to be understood that an outlet nipple may be utilized similar to the nipple 68 by reshaping to an oval configuration that portion of the nipple to be entered into a circular outlet opening in the end of a muffler shell.

Figure 13:
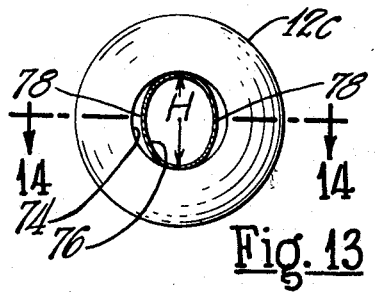
FIGURE 13 is an end view showing a slightly oval shaped nipple or coupling member inserted in an opening in the end of the muffler shell with the nipple or coupling member axially coincident with the muffler shell axis.
Figure 14:
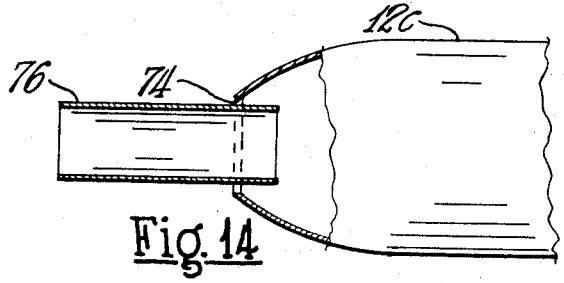
FIGURE 14 is a partial sectional view taken substantially on the line 14—14 of FIGURE 13 illustrating the position of the nipple or coupling member before it is adjusted to an angular position.
Figure 15:
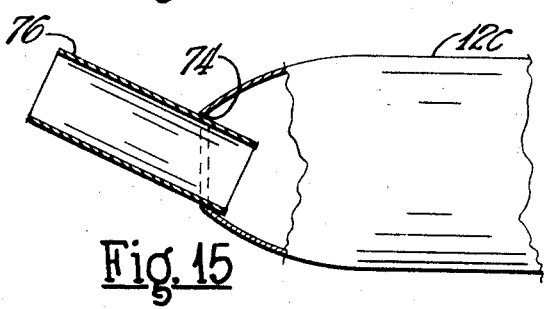
FIGURE 15 is similar to FIGURE 14 illustrating the nipple or coupling member in an angular position.

FIGURES 13 through 15 illustrate an arrangement wherein a nipple or bushing of oval or elliptical shape is adapted to be received in a circular opening in the end of a muffler shell. The muffler 12c is fashioned with an opening 74 of circular shape adapted to receive or accommodate a nipple or bushing 76 of oval or elliptical cross sectional configuration, the longer dimension H of the oval shape being substantially the same as the diameter of the opening 74, as shown in FIGURE 13.

In this form of construction, the nipple 76 is moved or adjusted to the angular position shown in FIGURE 15 whereby the flattened regions 78 of the oval configuration engage the edge defining the circular opening 74 throughout the periphery of the nipple. The nipple is welded to the edge region of the shell defining the opening to form a gas tight seal and to maintain the nipple 76 in its angular position relative to the longitudinal axis of the muffler shell. The extent of angularity of the nipple may be varied by modifying the shape of the oval cross sectional configuration of the nipple without modifying the dimension H of the nipple.

Figure 16:
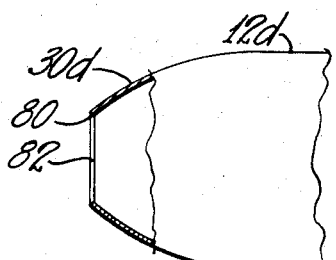
FIGURE 16 is a fragmentary view partially in section illustrating a circular opening in the end of the muffler shell.
Figure 18:
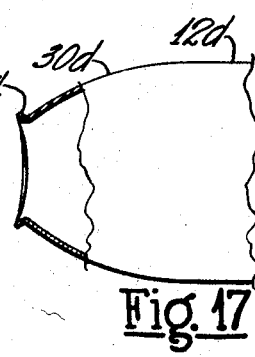
FIGURE 18 is an end view of the construction shown in FIGURE 17.
Figure 17:
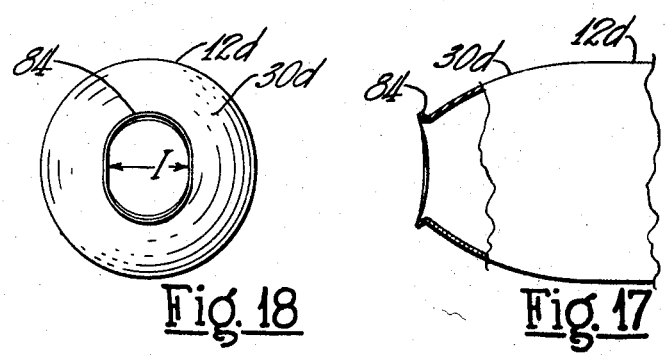
FIGURE 17 shows a step in the method in forming the circular opening of FIGURE 16 into a slightly oval-shaped opening.

FIGURES 16 through 18 shows a muffler shell 12d having a dome-shaped end region 30d, these figures illustrating steps in a method of forming an opening of generally oval shape by reshaping a circular opening formed in the end region of the dome-shaped portion 30d. As shown in FIGURE 16, the edge region 80 defines a circular opening 82 in the terminus of the dome-shaped portion 30d of the muffler shell.

By means of a suitable flanging tool applied to the edge region 80, the opening 82 is slightly distorted to an oval configuration defined by an outwardly flaring flange 84, the flange being formed by distorting the metal at opposed regions of the edge 80 to the configuration shown in FIGURES 17 and 18.

This form of opening accommodates a circular cylindrically-shaped tubular nipple, such as that shown in FIGURE 7, of an exterior diameter substantially equal to the width I or the least dimension of the oval shape. The cylindrical nipple or bushing is adjusted or moved to an angular position wherein the flange regions 84 at the longer axis of the oval configuration are engaged by peripheral surface of the cylindrical nipple thus providing an angular position for the nipple without distorting the cylindrically-shaped configuration thereof.

The nipple is then welded throughout its periphery to the metal of the shell defining the opening to form a gas tight seal and maintain the nipple in an angular position with respect to the axis of the muffler shell.

Figure 19:
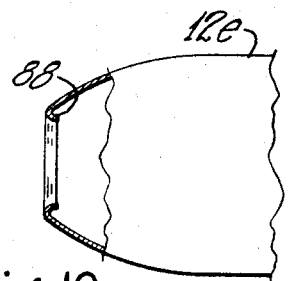
FIGURE 19 is a partial sectional view illustrating an inwardly extending flange defining an opening in the end of a muffler shell.

FIGURE 19 illustrates a modification for the end region of a muffler shell 12e wherein a portion of the muffler shell defining the opening in the end thereof is flanged inwardly as at 88 to define an opening of desired contour adapted to accommodate a nipple or bushing of oval shape.

In assembly, the oval-shaped nipple is inserted in the circular opening defined by the flange 88 and moved to an angular position until a peripheral surface region of the oval-shaped nipple engages the flange 88 throughout its periphery and the nipple welded throughout its periphery to the flange 88.

Figure 20:
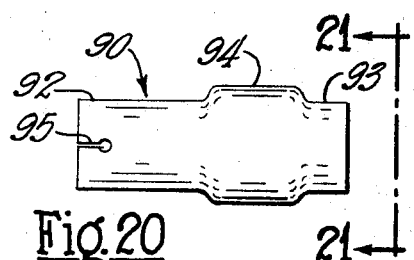
FIGURE 20 is an elevational view of a nipple or coupling member having an enlarged oval-shaped portion.
Figure 21:
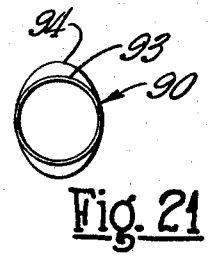
FIGURE 21 is an end view of the construction shown in FIGURE 20, the view being taken on the line 21—21 of FIGURE 20.

FIGURES 20 and 21 illustrate another form of nipple or bushing configuration. The tubular nipple construction 90 is fashioned with spaced portions 92 and 93 of circular cylindrical shape and an intermediate portion or region 94 of elliptical or oval configuration, as shown in FIGURE 21. The nipple 90 may be fashioned by contracting portions 92 and 93 of a tube of larger diameter by suitable dies and shaping the tube portion 94 to oval configuration, or a cylindrical tube of a diameter of portions 92 and 93 may be expanded by internal pressure to form an intermediate portion of the tube outwardly to provide the oval configuration 94.

In assembling this type of nipple or bushing with a muffler shell, the portion 94 may be inserted into a circular opening in the end of a muffler shell of a diameter substantially equal to the long axis of the oval portion 94, the short axis of the oval portion being equal to the exterior diameter of portions 92 and 93. By inserting the oval configuration 94 in a circular opening, the nipple or bushing 90 may then be moved or adjusted to an angular position relative to the longitudinal axis of the muffler shell until the peripheral regions of portion 94 engage an edge region defining the circular opening in the muffler throughout its circumference.

The portion 94 may then be welded to the metal of the edge region defining the circular opening in the muffler in much the same manner as the welding 45 in the form shown in FIGURE 1. Where the nipple 90 is employed as an inlet nipple the end region of the cylindrical portion 92 may be fashioned with diametrically opposed slots 95 whereby the end region of portion 92 may be clamped by conventional clamping means into snug engagement with an exhaust pipe telescoped interiorly into the portion 92 of the nipple 90.

Figure 22:
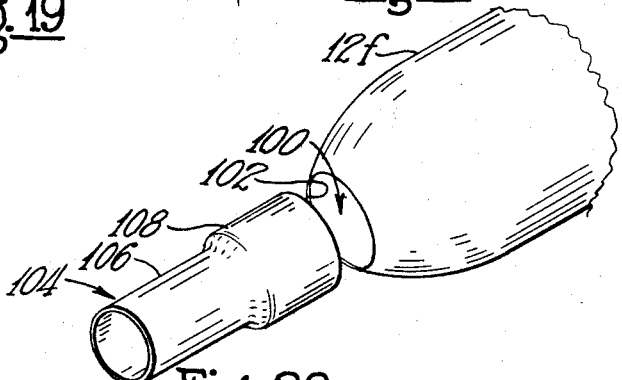
FIGURE 22 illustrates another form of nipple or coupling member fashioned with an enlarged oval-shaped portion.

FIGURE 22 illustrates a modified form of nipple or bushing construction. In this form the muffler shell 12f is fashioned with a circular opening 100 defined by a circular edge 102. The nipple or bushing 104 has a cylindrically-shaped portion 106 and a second portion 108, the latter being bulged or distorted outwardly to an elliptical or oval cross sectional configuration, the dimension of the longer axis of the elliptical portion 108 being substantially equal to the diameter of the circular opening 100 whereby the elliptical portion 108 is received in the opening 100.

The nipple 104 may be angularly positioned to an extent that the periphery of the elliptical portion 108 contacts substantially the entire circular edge region 102. The oval portion 108 is then welded to the terminus of the muffler shell 12f at the region of the circular edge 102 to form a gas tight seal and to maintain the nipple 104 in its angular position relative to the axis of the muffler 12f.

Figure 23:
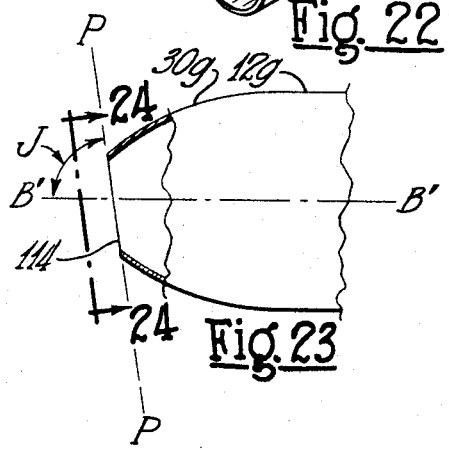
FIGURE 23 is a fragmentary view partially in section of an end region of a muffler shell illustrating an opening of generally oval shape in the end of the shell.
Figure 24:
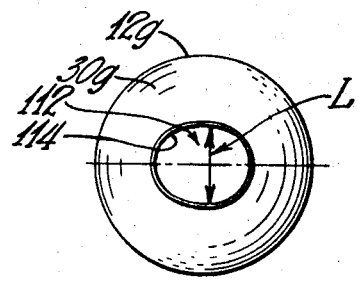
FIGURE 24 is an end view taken substantially on the line 24—24 of FIGURE 23 illustrating the contour of the opening in the muffler shell.

FIGURES 23 and 24 illustrate a muffler shell 12g with an opening in an end region of the dome shape 30g of the muffler shell. In this form the plane P—P of the opening 112 which is defined by the curved edge 114, is disposed at an acute angle J with respect to the shell axis B'—B' as shown in FIGURE 23. By fashioning the opening on a plane at an acute angle to the longitudinal axis B'—B' of the muffler shell, the opening 112 is of generally egg-shaped contour, as shown in FIGURE 24.

An opening of this configuration is adapted to receive a tubular cylindrical nipple of a diameter equal to the maximum width of the opening indicated at L in FIGURE 24. After insertion of a tubular cylindrically-shaped nipple into the opening 112, the nipple is adjusted to an angular position until the periphery of the nipple fully engages the curved edge 114 defining the opening, after which the nipple may be welded at the region of the circular edge 114 throughout the periphery of the nipple to form a sealed joint and to secure the nipple in angular relation with respect to the longitudinal axis B'—B' of the shell 12g.

The tubular nipple may be adjusted to a lesser angle and any voids or open regions that may exist between the edge 114 and the periphery of the cylindrical nipple are filled up with the welding material or weld filler to form a sealed joint.

In all forms of the construction illustrated herein, the tubular nipples may be adjusted to lesser than maximum angles permitted by the particular configurations of openings in the muffler shell and the cross sectional configurations of the nipples, and any voids existent by reason of a lesser angle of inclination of the nipple relative to the longitudinal axis of the muffler shell may be filled with weld material or weld filler and form a gas tight joint or shell, the welds maintaining the nipples in their adjusted positions.

The arrangements of the invention involve the use of nipples of cylindrical cross section or oval cross section to obtain various angular positions of the nipples with respect to the axis of the muffler without requiring a special fabrication of nipple for a particular angle. As the nipple construction in all forms illustrated herein are of generally cylindrical or slightly oval configuration, the nipples may be fabricated from lengths of sheet metal tubing thereby providing an inexpensive nipple construction for a muffler assembly wherein the nipples may be angularly arranged with respect to the axis of the muffler shell and adjusted to the desired angular position without specially configurating the nipple or bushing. By utilizing openings in dome-shaped ends of a muffler shell in conjunction with nipple constructions of circular cylindrical or oval cross section, the nipples may be adjusted to various angular positions as required by a particular installation, thereby reducing the inventory of nipples to effect various angular conditions in order to join exhaust pipes and tailpipes with the inlet and outlet bushings of a muffler construction.

It is apparent that, within the scope of the invention, modifications and different arrangements may be made other than as herein disclosed, and the present disclosure is illustrative merely, the invention comprehending all variations thereof.

I claim:

1. A muffler for use with the exhaust system of an internal combustion engine including an elongated tubular metal shell having an end region of dome-shaped configuration terminating in a continuous edge defining a noncircular opening, a thin-walled tubular fitting having a portion of noncircular cross section extending into the opening, the axis of the tubular fitting being disposed at an acute angle with respect to the longitudinal axis of the tubular shell, the continuous edge of the shell being joined to the exterior surface of the fitting by welding to provide a fluid tight joint between the shell and the fitting, and tubular gas passage means mounted within the shell.

2. A muffler for use with the exhaust system of an internal combustion engine including an elongated tubular metal shell having an end region of dome-shaped configuration terminating in a continuous edge defining an opening of slightly oval shape, a tubular metal coupling member having a portion of a cross-sectional shape substantially reciprocal to that of the opening and extending into the opening, the coupling member being disposed with its axis at an acute angle with respect to the longitudinal axis of the muffler shell, the continuous edge defining the opening in the shell being joined to the adjacent exterior surface of the tubular fitting by welding to provide a fluid tight joint, and tubular gas passage means mounted within the shell.

3. The method of producing a muffler comprising the steps of terminating an end region of a thin-walled metal tube of dome-shaped configuration in an edge defining a substantially circular opening, disposing in the opening a cylindrically shaped region of a thin-walled tubular metal member of lesser exterior dimension than the diameter of the opening, arranging the tubular member at an acute angle with respect to the axis of the tube to distort the tubular member to thereby establish contact of the exterior surface of the member with the edge defining the opening throughout substantially the periphery of the member, and welding the edge of the tubular member throughout its periphery to form a gas tight joint.

4. The method of producing a muffler comprising the steps of terminating an end region of a one-piece thin-walled metal tube of dome-shaped configuration in an edge defining an opening, disposing in the opening an oval-shaped region of a thin-walled tubular metal member with a portion of the member extending through the opening, arranging the tubular member at an acute angle with respect to the axis of the metal tube to thereby establish contact of the exterior surface of the oval-shaped region with the edge defining the opening throughout substantially the periphery of the member, and welding the edge to the tubular member throughout its periphery to form a gas tight joint.

5. A muffler for use with the exhaust system of an internal combustion engine including an elongated tubular metal shell having an end region of dome-shaped configuration terminating in a continuous edge defining an opening, a tubular member having a portion of oval shape in cross section extending into the opening, the axis of the tubular member being angularly disposed with respect to the longitudinal axis of the tubular shell, the continuous edge defining the opening in the shell being joined to the oval-shaped portion of the member by welding to provide a fluid tight joint between the shell and the member, and tubular gas passage means mounted within the shell.

6. A muffler for use with the exhaust system of an internal combustion engine including a one-piece elongated tubular metal shell having an integral end region of dome-shaped configuration terminating in a continuous edge defining an opening of oval shape, a tubular member having a cylindrical portion of lesser dimension than the opening extending into and through the opening, the axis of the tubular member being angularly disposed with respect to the longitudinal axis of the tubular shell, the continuous edge defining the opening in the shell being joined to the cylindrical portion of the member by welding to provide a fluid tight joint between the shell and the member, and tubular gas passage means mounted within the shell.

7. A muffler for use with the exhaust system of an internal combustion engine including an elongated tubular metal shell having an end region of dome-shaped configuration terminating in a continuous edge defining a circular opening, a thin-walled tubular fitting having a portion of noncircular cross section extending into the opening, the axis of the tubular fitting being disposed at an acute angle with respect to the longitudinal axis of the tubular shell, the continuous edge of the shell being joined to the exterior surface of the fitting by welding to provide a fluid tight joint between the shell and the fitting, and tubular gas passage means mounted within the shell.

References Cited

UNITED STATES PATENTS

| | | | |
|---|---|---|---|
| 1,972,065 | 8/1934 | Noblitt | 181—48 |
| 2,182,204 | 12/1939 | Hector | 181—54 |
| 2,360,429 | 10/1944 | Leadbetter. | |
| 2,825,421 | 3/1958 | Bryant. | |
| 2,872,998 | 2/1959 | Tinker. | |
| 3,042,138 | 7/1962 | Reinert. | |
| 3,159,239 | 12/1964 | Andrews | 181—61 |
| 3,274,678 | 9/1966 | Andrews | 29—471.1 |
| 3,313,373 | 4/1967 | Marx. | |
| 2,834,425 | 5/1958 | Rawson. | |

FOREIGN PATENTS

| | | |
|---|---|---|
| 49,088 | 7/1938 | France. |
| 892,780 | 3/1962 | Great Britain. |
| 308,088 | 9/1955 | Switzerland. |

ROBERT S. WARD, JR., *Primary Examiner.*